(12) United States Patent
Segler

(10) Patent No.: US 11,522,747 B1
(45) Date of Patent: Dec. 6, 2022

(54) CLOUD SERVICE OUTAGE REPORTING

(71) Applicant: SAP SE, Walldorf (DE)

(72) Inventor: Michael Segler, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/342,700

(22) Filed: Jun. 9, 2021

(51) Int. Cl.
  *H04L 41/0631* (2022.01)
  *H04L 43/045* (2022.01)
  *H04L 41/0604* (2022.01)
  *H04L 41/069* (2022.01)

(52) U.S. Cl.
  CPC ........ *H04L 41/0631* (2013.01); *H04L 41/069* (2013.01); *H04L 41/0627* (2013.01); *H04L 43/045* (2013.01)

(58) Field of Classification Search
  CPC ............. H04L 41/0631; H04L 41/0627; H04L 41/069; H04L 43/045
  USPC ........................................................ 709/224
  See application file for complete search history.

(56) References Cited

U.S. PATENT DOCUMENTS

| | | | |
|---|---|---|---|
| 8,302,108 | B1 | 10/2012 | Hurren et al. |
| 10,067,863 | B1 | 9/2018 | Gandhi et al. |
| 10,572,842 | B1* | 2/2020 | To .......................... H04L 63/08 |
| 10,855,740 | B1* | 12/2020 | Ellis ...................... H04L 41/142 |
| 11,188,313 | B1 | 11/2021 | Huffman et al. |
| 2018/0322037 | A1 | 11/2018 | Thazhathekalam et al. |
| 2019/0065179 | A1 | 2/2019 | Novak et al. |
| 2020/0012954 | A1* | 1/2020 | Botea ...................... G06F 40/35 |
| 2020/0023862 | A1 | 1/2020 | Rodriguez Bravo et al. |
| 2020/0076538 | A1* | 3/2020 | Soultan ................... G06N 20/00 |
| 2020/0184278 | A1* | 6/2020 | Zadeh .................... G06K 9/6264 |
| 2020/0228414 | A1* | 7/2020 | Garty ...................... H04L 41/22 |
| 2020/0371901 | A1* | 11/2020 | Sastry .................. G06F 11/3692 |
| 2021/0064635 | A1* | 3/2021 | Tommasi ............... G06N 20/00 |
| 2021/0067422 | A1* | 3/2021 | Stavisski ................. H04L 12/66 |
| 2021/0067607 | A1* | 3/2021 | Gardner ................ H04L 41/082 |
| 2021/0084536 | A1* | 3/2021 | Chou ..................... H04W 36/08 |
| 2021/0111942 | A1* | 4/2021 | Tahhan ............... H04L 41/0654 |
| 2021/0127351 | A1* | 4/2021 | Stojanovski .......... H04W 48/16 |
| 2021/0203567 | A1* | 7/2021 | Hoopes ................. H04L 43/045 |
| 2021/0208971 | A1* | 7/2021 | Srinivasan ............ G06F 11/326 |
| 2021/0248514 | A1* | 8/2021 | Celia .................. G06Q 30/0201 |
| 2021/0311860 | A1* | 10/2021 | Botea .................. G06F 11/3684 |

(Continued)

OTHER PUBLICATIONS

"U.S. Appl. No. 17/348,208, Non Final Office Action dated Jul. 12, 2022", 10 pgs.

*Primary Examiner* — Melvin H Pollack

(74) *Attorney, Agent, or Firm* — Schwegman Lundberg & Woessner, P.A.

(57) ABSTRACT

Various examples are directed to systems and methods for providing software services to one or more consumer systems. A cloud service provider system may receive a first outage message from a second cloud service provider system. The first outage message may describe a first outage of a first software service consumed by the first cloud service provider system and provided by the second cloud service provider system. The cloud service provider system may apply a set of outage inheritance rules to the first outage message and determine that the first outage is to be auto-reported. The cloud service provider system may render a revised first outage message and send the revised first outage message to a consumer system that receives a second software service provided by the cloud service provider system.

20 Claims, 7 Drawing Sheets

(56) References Cited

U.S. PATENT DOCUMENTS

| | | | |
|---|---|---|---|
| 2021/0320836 A1* | 10/2021 | Leibkowiz | G06F 16/2358 |
| 2021/0342139 A1 | 11/2021 | Verma et al. | |
| 2021/0373860 A1* | 12/2021 | Khan | G06F 9/546 |
| 2022/0086669 A1* | 3/2022 | Yao | H04L 43/0876 |

* cited by examiner

CLOUD SERVICE OUTAGE REPORTING

BACKGROUND

Traditionally, software has been self-contained and executed on one or more local machines. An enterprise desiring to use a software tool builds an on-site computing system and executes the software tool on that computing system. The software tool may be developed by the enterprise and/or purchased from a third party software provider. The user accesses the software tool directly from the computing system or remotely via a networked user computing device.

In this arrangement, the enterprise using the software tool is responsible for infrastructure, platform, and application level management. For example, the enterprise is responsible for purchasing, setting-up, and maintaining any servers, network hardware, etc., for the on-site computing system. The enterprise is also responsible for platform maintenance including operating systems, middleware, etc. The enterprise may also have responsibility for the software tool itself at the application level.

BRIEF DESCRIPTION OF DRAWINGS

The present disclosure is illustrated by way of example and not limitation in the following figures.

DETAILED DESCRIPTION

Figure 1:
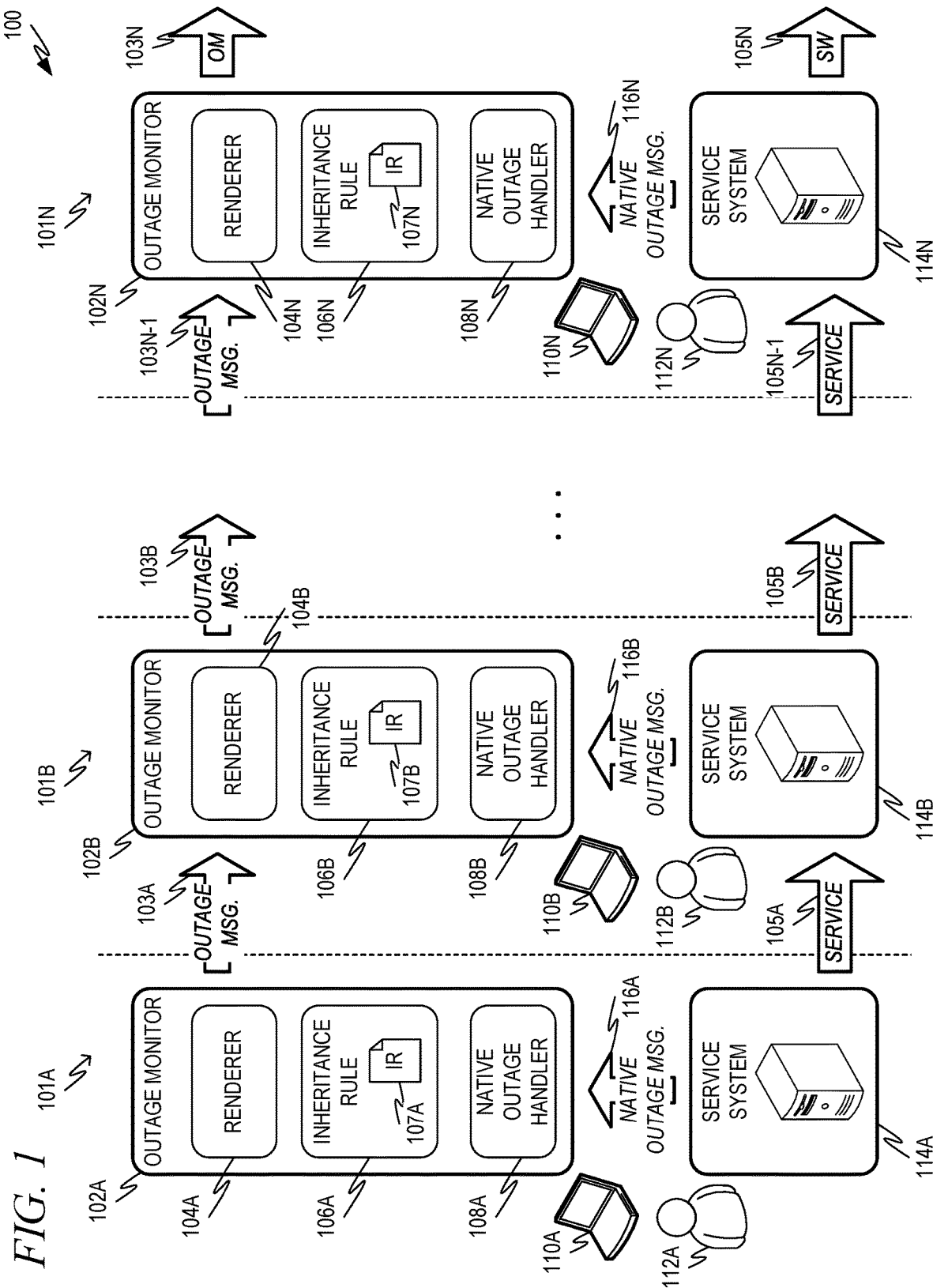
FIG. 1 is a diagram showing one example of an environment for managing outages in a chain of cloud service provider systems.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Cloud computings provide enterprises with options for using software tools without having responsibility for all levels of infrastructure, platform, and application management. Different types of cloud computing services include Infrastructure as a Service (IaaS) cloud computing services, Platform as a Service (PaaS) cloud computing services, and Software as a Service (SaaS) service. Each type of cloud computing service manages different aspects of software tool usage for an enterprise.

IaaS cloud computing services provide an enterprise with virtual, scalable infrastructure such as, for example, virtual servers, virtual networking, virtual databases and other storage, etc. For example, an IaaS cloud service provider system may implement virtualization technology to provide enterprises (referred to as IaaS clients) with a virtual data center including one or more virtual machines acting as virtual servers. In this way, it may not be necessary for the IaaS client to maintain a physical data center. An IaaS client may be responsible for, and therefore have flexibility to change, features such as applications, runtime, operating systems, middleware, and data.

PaaS cloud computing services provide an enterprise with a framework that developers at a PaaS client may use to develop applications, such as user-level applications. For example, the PaaS client may be responsible for developing an application and managing data. The PaaS service provider system, however, may provide a scalable infrastructure and platform components such as operating systems, middleware, and runtimes.

SaaS cloud computing services provide an enterprise with an, often scalable, software tool directly via the Internet or another suitable network. An SaaS cloud service provider system may provide infrastructure, platform, application, and data management. The SaaS client may purchase access to the application such as, for example, for a set of users. In this way, the SaaS client may not need to manage any hardware, infrastructure, or platform components.

The proliferation of cloud computing services has increased the convenience and flexibility available to enterprises that generate software tools, either for their own consumption or for sale. At the same time, however, the use of cloud computing services has created additional difficulties. One difficulty associated with cloud computing services relates to chain of cloud computing services and outages. Cloud computing services are arranged in a chain when one cloud computing service consumes another cloud computing service, and so one.

Consider an example PaaS cloud service provider system. The PaaS cloud service provider system may consume IaaS cloud services, such as virtual servers, networking, database, etc., from one or more IaaS cloud service providers. The PaaS cloud service provider may also provide one or more PaaS cloud services that are consumed by an SaaS cloud service provider. For example, the SaaS cloud service provider may consume a virtual platform provided by the PaaS cloud service provider in order to provide an application to one or more consumer systems.

In a chain of cloud computing services, an outage at a lower-level cloud computing service affects the direct consumers of that service as well as indirect consumers of the service. In the example cloud computing service chain above, for example, if an IaaS cloud service providing virtual servers has an outage, it may affect the PaaS cloud service that directly consumes the IaaS cloud service, as well as any downstream services or consumers who consume the PaaS service.

A cloud service provider may be responsible to its own consumers for the software service that it provides, for example, according to a Service Level Agreement (SLA). This includes responsibilities for outages at the cloud service provider system as well as outages of services consumed by the cloud service provider system to provide the software service to its own consumers.

When an outage occurs at a cloud service provider system, the cloud service provider system generates one or more outage messages describing the outage and provides the outage message to services and/or applications that consume the affected cloud service. The type and frequency of outage messages may be set by the SLA for the cloud computing service, as described in more detail herein. The SLA may set forth a number of different messages to be sent about an outage including, for example, outage detection messages, outage estimation messages, intermediate outage solution known messages, final outage root cause messages, etc.

Consider an example where an outage occurs at a lower-level cloud service provider that provides a cloud service, such as an IaaS or PaaS cloud service, to one or more intermediate cloud service providers, such as PaaS or SaaS cloud service providers. The lower-level cloud service provider system sends one or more outage messages to the services and/or applications that consume the lower-level cloud computing service, including an intermediate service provider system. The intermediate service provider system consumes the lower-level cloud computing service and also provides an intermediate cloud computing service to one or more other application and/or services. Accordingly, the outage at the lower-level cloud computing service may cause a corresponding outage of the intermediate cloud service, triggering the intermediate service provider system to send one or more outage messages to its own consumers according to its SLAs with the consumers.

When an intermediate cloud service provider system receives an outage message from a lower-level cloud service provider system, it may be desirable for the intermediate cloud service provider to pass on some or all of the information from the outage message to the consumers of the intermediate cloud service. In some circumstances, however, it is not desirable for the intermediate cloud service provider to pass on an outage message. For example, the outage message may relate to operational aspects of a lower-level consumed service that are not of interest to the intermediate cloud service provider system's own consumers. Even when an outage message is not to be passed directly to the intermediate cloud service provider system's own consumers, the reported outage may still information may cause an outage to the intermediate cloud service which is to be reported to the consumers per the intermediate cloud service SLA.

The intermediate cloud service provider system, in some examples, can simply forward all received outage messages to its own consumers, along with outage messages describing outages of the intermediate cloud service itself. This, however, may flood the intermediate cloud service consumers with outage messages that may or may not be relevant or even intelligible to the consumers. It may also result in heterogeneous message formats, as the messages from lower-level cloud service provider systems may be from providers that are hidden to the consumers of the intermediate cloud service and, therefore, unfamiliar. Flooding consumers with unfamiliar and potentially irrelevant outage messages may compromise consumer confidence in the intermediate cloud service.

In some examples, an intermediate cloud service provider system can employ a human user or users to review incoming outage messages and generate suitable outage messages to its own consumers. For example, if the human user or users determines that the reported outage will affect consumers of the intermediate cloud service, the human user causes the intermediate cloud service provider system to send a corresponding outage message to its own consumers. The human user may, for example, generate a new outage message according to a format of the intermediate cloud service provider system that is recognizable and/or familiar to the consumers. At the ordinary consumption levels of many cloud services, however, human analysis and generating of follow-on outage messages takes a lot of time. Delaying outage messages to consumers while a human review takes place may also compromise consumer confidence in the intermediate cloud service.

Various examples described herein address these and other issues with systems and method for providing software services to one or more consumer systems. The software services may be cloud services provided over the Internet or another suitable network and may include IaaS, PaaS, and SaaS cloud services, as described herein. A first cloud service provider system may execute an outage monitor. The outage monitor receives a first outage message from a second cloud provider system. The first outage message describes a first outage of a first software service consumed by the first cloud service provider system and provided by the second cloud service provider system. The outage monitor applies a set of one or more inheritance rules to the first outage and, based on the application of the set of one or more inheritance rules, assigns the first outage message for further processing.

In some examples, the application of the inheritance rules indicates that the first outage message is not to be passed on to consumers of the first cloud service provider system. For example, the outage message may describe an intermediate or final cause of the first outage and/or may report when an intermediate outage solution is to be replaced by a final outage solution. In these cases, consumers of the first cloud service provider system may not need to receive an indication of the outage message.

In some examples, the application of the inheritance rules indicates that the first outage message requires review by a human user before being sent to consumers of the first cloud service provider system. Accordingly, the outage monitor may add the first outage message to a queue for consideration by a human users. After review by a human user, the human user may send revised first outage information to a renderer. The renderer renders the revised first outage message using the revised first outage information in a form that can be provided to the consumers of the first cloud service provider system. For example, the renderer may supplement or replace a name and/or graphic of the second cloud service provider system with a name and/or graphic of the first cloud service provider system. In this way, consumers of the second cloud service provider system may recognize the revised first outage message. The renderer may also replace and/or supplement some or all of the text of the first outage message with text provided by the human user. For example, the renderer may rephrase an outage description from the incoming outage message and/or translate the description into a language called for by the cloud service provider's SLA with its own consumers.

In some examples, the structure and content of the outage message received by the second cloud service provider system is similar to the native outage messages that the second cloud service provider system would send to its own consumers. According, the revised first outage message produced by the renderer may be similar content and feel to a native outage message.

In some examples, the application of the inheritance rules indicates that the first outage message should be sent to consumers. Accordingly, the outage monitor may provide the first outage message to the renderer. The renderer generates a revised first outage message from the received first outage message. For example, the renderer may supplement or replace a name and/or graphic of the second cloud service provider system with a name and/or graphic of the first cloud service provider system. The renderer may also replace and/or supplement some or all of the text of the first outage message with revised text.

FIG. 1 is a diagram showing one example of an environment 100 for managing outages in a chain of cloud service provider systems 101A, 101B, 101N. The environment 100 includes three cloud service provider system 101A, 101B, 101N that are arranged in a chain. The cloud service provider system 101A, provides a software service 105A that is consumed by the cloud service provider system 101B. The cloud service provider system 101B provides a software service 105B that is consumed by a next cloud service provider system in the chain. The cloud service provider system 101N consumes a software service 105N-1 and provides a software service 105N to a consumer that may be an end user and/or another cloud service provider system. The software services 105A, 105B, 105N-1, 105N may be any suitable software services and, in some examples, may be or include IaaS cloud services, PaaS cloud services, and/or SaaS cloud services.

The cloud service provider systems 101A, 101B, 101N comprise one or more computing devices such as, for example, one or more servers. In various examples, one or more of the cloud service provider systems 101A, 101B, 101N consume one or more virtual servers, network, data storage, or other IaaS service provided by a lower-level cloud service provider systems 101A, 101B, 101N and utilize the consumed IaaS cloud service to provide respective software services 105A, 105B, 105N-1, 105N. Also, in some examples, one or more of the cloud service provider systems 101A, 101B, 101N consume one or more PaaS services provided by a lower-level cloud service provider system 101A, 101B, 101N and utilize the consumed PaaS service(s) to provide respective software services 105A, 105B, 105N-1, 105N. In some examples, one or more of the cloud service provider systems 101A, 101B, 101N provides a SaaS cloud service to a consumer such as an end user or users and/or another cloud service provider system 101A, 101B, 101N.

Cloud service provider systems 101A, 101B, 101N include respective outage monitor systems 102A, 102B, 102N and service systems 114A, 114B 114N. The service systems 114A, 114B, 114N may be configured to consume services 105A, 105B, 105N-1, 105N provided by lower-level cloud service provider systems 101A, 101B, 101N and provide services 105A, 105B, 105N-1, 105N to the respective consumers.

The cloud service provider systems 101A, 101B, 101N may provide an SLA to consumers of the respective software services 105A, 105B, 105N-1, 105N. An SLA describes terms of service including what a software service 105A, 105B, 105N-1, 105A is to do and performance parameters that the software service 105A, 105B, 105N-1, 105N is to meet. For example, an SLA for an IaaS cloud service providing data storage may indicate an amount of storage to be provided and a latency or delay in accessing data stored with the service. In another example, an SLA for a PaaS service may indicate a number of concurrent users, a number of transactions that can be supported, a speed for processing transactions, etc.

In some examples, an SLA also describes notifications that a cloud computing service is expected to provide to consuming services and application to describe operational events at the cloud computing service, such as outages. The SLA typically provides for different types of outage messages including different information about when an outage occurs and how it is fixed or planned to be fixed.

The service systems 114A, 114B, 114N are configured to detect service outages and direct native outage messages 116A, 116B, 116N. An outage may occur when the service 105A, 105B, 105N is down or degraded. For example, a service system 114A, 114B, 114N may detect an outage when the service system 114A, 114B, 114N, or a component thereof, is down and the service 105A, 105B, 105N-1, 105N can no longer be provided until the service system 114A, 114B, 114N or the component thereof is back up. Also, in some examples, the service system 114A, 114B, 114N detects an outage when the performance of the service system 114A, 114B, 114N or a component thereof is degraded such that the service 105A, 105B, 105N-1, 105N is degraded. For example, an IaaS service providing networking may be degraded if the networking speed provided to consumers drops below a threshold (e.g., a threshold indicated by the relevant SLA). In another example, an SaaS service providing an application to concurrent users may be degraded if the number of concurrent users that the software service can support drops below a threshold (e.g., a threshold indicated by the relevant SLA).

Upon detecting an outage, the service system 114A, 114B, 114N may create a native outage message 116A, 116B, 116N. The native outage message 116A, 116B, 116N may include a description of the outage and an indication of the cloud service provider system 101A, 101B, 101N that is the source of the outage.

In some examples, outage messages 116A, 116B, 116N are generated at various different times in the lifecycle of an outage. Different categories of outage messages 116A, 116B, 116N may be sent, for example, to indicate different information about an outage and/or at different stages in the lifecycle of an outage. For example, an outage detection message may be sent when a service system 114A, 114B, 114N detects an outage. An outage estimation message indicates an estimated duration of an outage, and may be sent when the service system 114A, 114B, 114N determines and/or updates an estimated duration of the outage. An outage update message may be sent to provide updated information about an outage such as, for example, an updated estimated duration or other information.

The service system 114A, 114B, 114N may generate an outage cause message when the service system 114A, 114B, 114N determines what has caused an outage. An outage solution known message may be sent when the service system 114A, 114B, 114N becomes aware of a solution to an outage. The outage solution message may indicate the solution and may also include information about the solution such as, for example, when it will be implemented. A solution deployed message may be sent by the service system 114A, 114B, 114N when an outage solution is deployed and, for example, the outage is over.

In various examples, outage cause, outage solution known, and outage solution deployed messages may be further categorized by time in the lifecycle of an outage. For example, an intermediate outage cause message may be sent when the service system 114A, 114B, 114N determines an intermediate cause and may indicate the intermediate cause. An intermediate solution to the outage may be indicated by an intermediate solution known message. The intermediate solution may be a temporary solution to restore the software service 105A, 105B, 105N while a final cause and/or final solution are determined or implemented. When an intermediate solution to an outage is deployed, it may be indicated by an intermediate solution deployed message. Similarly, a final outage root cause message may be sent when the service system 114A, 114B, 114N determines a final reason that the outage occurred and may include a description of the final cause. A final outage solution known may be sent when the service system 114A, 114B, 114N determines a final solution to the outage and a final outage solution deployed message may indicate that the final solution has been deployed (or an estimate of when it will be deployed).

In the example of FIG. 1, native outage messages 116A, 116B, 116N are provided to outage monitor systems 102A, 102B, 102N of the respective cloud service provider systems 101A, 101B, 101N. In some examples, native outage messages 116A, 116B, 116N are provided directly to the consumers of the respective software services 105A, 105B, 105N-1, 105N.

The outage monitor systems 102A, 102B, 102N may include respective renderers 104A, 104B, 104N and inheritance rule systems 106A, 106B, 106N. Optionally, outage monitor systems 102A, 102B, 102N also include native outage handlers 108A, 108B, 108N. Outage monitor systems 102A, 102B, 102N receive outage messages from lower-level cloud service provider systems 101A, 101B, 101N. For example, the outage monitor 102B receives outage messages 103A from the cloud service provider system 101A. The outage monitor 102N may receive outage messages 103N-1 from the cloud service provider system or systems that provide services directly consumed by the service provider system 101N.

The optional native outage handlers 108A, 108B, 108N may receive native outage messages 116A, 116B, 116N from the respective service systems 114A, 114B, 114N. The native outage messages 116A, 116B, 116N may be forwarded to consumers of the respective software services 105A, 105B, 105N-1, 105N. In some examples, the native outage handlers 108A, 108B, 108N call the respective renderers 104A, 104B, 104N to generate outage messages to be provided to consumers of the software services 105A, 105B, 105N-1, 105N, as described herein.

Upon receiving an outage message 103A, 103B, 103N-1, 103N from cloud service provider system 101A, 101B, 101N, the outage monitor systems 102A, 102B, 102N may call the inheritance rule system 106A, 106B, 106N to apply a set of one or more inheritance rules 107A, 107B, 107N. The inheritance rules 107A, 107B, 107N may describe outage messages that are to be forwarded to consumers of the respective services 105A, 105B, 105N-1, 105N, outage messages that are not to be forwarded to the consumers, and outage messages that should be reviewed by a human user 112A, 112B, 112B before being provided to consumers.

In some examples, inheritance rules 107A, 107B, 107N indicate the disposition of incoming outage messages 103A, 103B, 103N-1, 103N based on the category of the outage message. Outage message categories, as described herein, can be based on the type of information in the outage message and the stage in the lifecycle of the outage.

In some examples, application of the set of one or more inheritance rules 107A, 107B, 107N will indicate that an incoming outage message 103A, 103B, 103N-1, 103N are to be automatically forwarded the outage message to service consumers. A cloud service provider system 101A, 101B, 101N automatically reports an outage message 103A, 103B, 103N-1, 103N by forwarding the outage message 103A, 103B, 103N-1, 103N to a service consumer without review or modification by a human user 112A, 112B, 112N. An automatically-reported outage message 103A, 103B, 103N-1, 103N may be forwarded to a service consumer as-is.

In some examples automatically forwarding an outage message 103A, 103B, 103N-1, 103N includes generating a revised outage message (e.g., using a renderer 104A, 104B, 104N) and sending the revised outage message to the service consumer. The outage monitor systems 102A, 102B, 102N may provide outage message 103A, 103B, 103N-1, 103N to the renderer 104A, 104B, 104N. The renderer 104A, 104B, 104N may modify the incoming outage message 103A, 103B, 103N-1, 103N to a format for sending to service consumers, resulting in revised outage messages 103A, 103B, 103N. For example, the renderer 104B may be configured to convert an incoming outage message 103A to a format that can be provided as an outgoing message 103B to the next cloud service provider system in the chain of FIG. 1.

The renderer 104A, 104B, 104N, in some examples, modifies incoming outage messages 103A, 103B, 103N to include the name of the respective cloud service provider system 101A, 101B, 101N, the logo of the cloud service provider system 101A, 101B, 101N, and/or a provider message included with the incoming outage message 103A, 103B, 103N. This can include modifying, supplementing, and/or replacing the name, logo, and/or provider message included in an incoming outage message 103A, 103B, 103N by a previous cloud service provider system 101A, 101B, 101N in the chain of FIG. 1. The result of the modifications to an incoming outage messages 103A, 103B, 103N is an performed by the renderers 104A, 104B, 104N is a revised outage message 103A, 103B, 103N that is sent to the consumers of the respective software services 105A, 105B, 105N-1, 105N.

In some examples, application of the set of one or more inheritance rules 107A, 107B, 107N may indicate that an incoming outage message 103A, 103B, 103N is to be reviewed by a human user 112A, 112B, 112N before being passed on to service consumers. For example, when the application of the set of one or more inheritance rules 107A, 107B, 107N indicates that an incoming outage message 103A, 103B, 103N is to be reviewed by a human users, the outage monitor systems 102A, 102B, 102N may add the incoming outage message 103A, 103B, 103N to a queue for consideration by a human user 112A, 112B, 112N. The human user 112A, 112B, 112N may access the queue using a user computing device 110A, 110B, 110N. User computing devices 110A, 110B, 110N may be or include any suitable type of computing device including, for example, a tablet computer, a laptop computer, a desktop computer, a mobile computing device, etc.

Upon reviewing an incoming outage message 103A, 103B, 103N, the user 112A, 112B, 112N may suggest modifications. Modifications suggested by the user 112A, 112B, 112N may be provided to the renderer 104A, 104B, 104N, which may generate a revised outage message and provide the revised outage message 103A, 103B, 103N to one or more consumers of the relevant service. In other examples, the user 112A, 112B, 112N may determine that the incoming outage message 103A, 103B, 103N is not to be provided to consumers of the relevant service.

Figure 2:
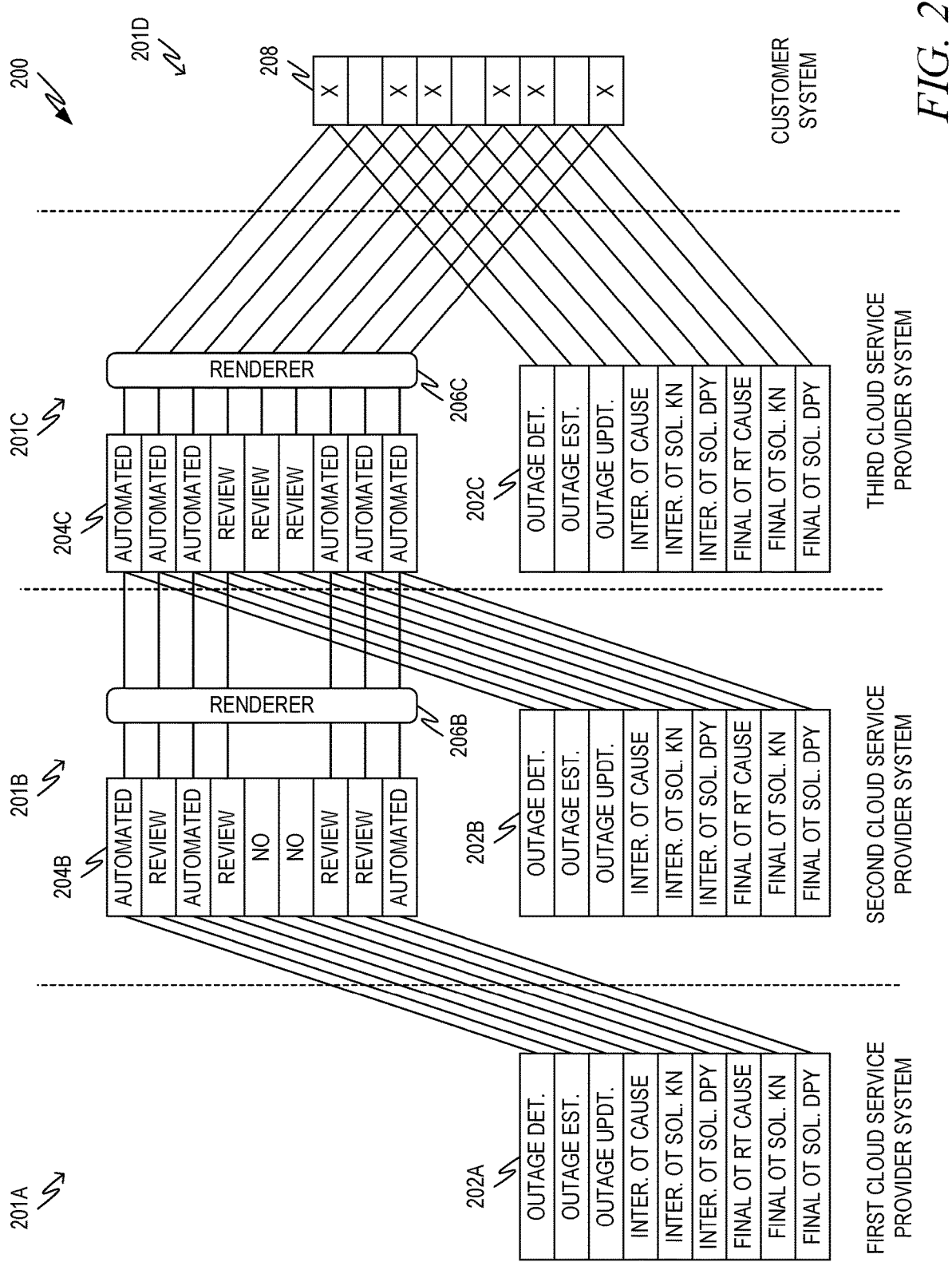
FIG. 2 is a workflow diagram showing one example of a workflow for implementing cloud outage reporting.

FIG. 2 is a workflow diagram showing one example of a workflow 200 for implementing cloud outage reporting. The workflow 200 may be executed in a chain of cloud service provider systems 201A, 201B, 201C and an end consumer system 201D. For example, the first cloud service provider system 201A may provide one or more IaaS cloud services to the second cloud service provider system 201B. The second cloud service provider system 201B may provide one or more PaaS cloud services to the third cloud service provider system 201C while consuming the IaaS services provided by the first cloud service provider system. The third cloud service provider system 201C may provide one or more SaaS cloud services to the end-consumer system 201D while consuming the PaaS services provided by the second cloud service provider system 201B. The end-consumer system 201D may consume the SaaS cloud services provided by the third cloud service provider system 201C (e.g., without providing a depending cloud service to any customer or consumers of its own).

The first cloud service provider system 201A generates various outage messages 202A in various categories. In the example of FIG. 2, the categories of the outage messages 202A include outage determination, outage estimation, outage update, intermediate outage cause, intermediate outage solution known, intermediate outage solution deployed, final outage root cause, final outage solution known, and final outage solution deployed. Any other arrangement of outage message categories may be used, as described herein.

The first cloud service provider system 201A, when appropriate, provides outage messages 202A to the second cloud service provider system 201B. The second cloud service provider system 201B applies a set of one or more inheritance rules 204B to determine whether to forward outage messages to the third cloud service provider system 201C. In this example, the set of one or more inheritance rules 204B are based on the category of incoming outage messages. Any arrangement of inheritance rules may be used. In this example, however, outage determination, outage update, and final outage solution applied category outage messages from the first cloud provider system 201A are automatically sent to the third cloud service provider system 201C. Outage estimation, intermediate outage cause, final outage root cause, and final outage solution known category outage messages are queued for review by a human user, and intermediate outage solution known and intermediate outage solution deployed category messages are not forwarded.

Outage messages that are to be provided to the third cloud service provider system 201C, either automatically or conditionally upon review by a human user, can be provided to the renderer 206B to generate revised outage messages. Rendered outage messages are provided to the third cloud service provider system 201C. In this example, the second cloud service provider system 201B also generates native outage messages 202B that are also provided to the third cloud service provider system 201C.

The third cloud service provider system 201C applies its own set of one or more inheritance rules 204N to determine which of the incoming outage messages from the second cloud service provider system 201B are to be provided to the end-consumer system 201D. In the example of FIG. 2, the inheritance rules 204C are also based on the category of the incoming outage messages. In this example, outage detection messages, outage estimation messages, outage update messages, final outage root cause messages, final outage solution known messages, and final outage solution deployed messages are automatically sent to the consuming end-consumer system 201D. Intermediate outage cause messages, intermediate outage solution known messages, and intermediate solution deployed messages are reviewed by human users before (potentially) being sent to the end-consumer system 201D.

Outage messages that are to be provided to the end-consumer system 201D are provided to the renderer 206C to generate revised outage messages. The revised outage messages are provided to the end-consumer system 201D. In this example, the end-consumer system 201D has a subscription set 208 indicating the categories of outage messages to which the end-consumer system 201D subscribes, e.g., either modified outage messages from the renderer 206C and/or native outage messages 202C generated by the third cloud service provider system 201C. In some examples, only outage messages of the categories subscribed to by the end-consumer system 201D are provided to the end-consumer system 201D.

Figure 3:
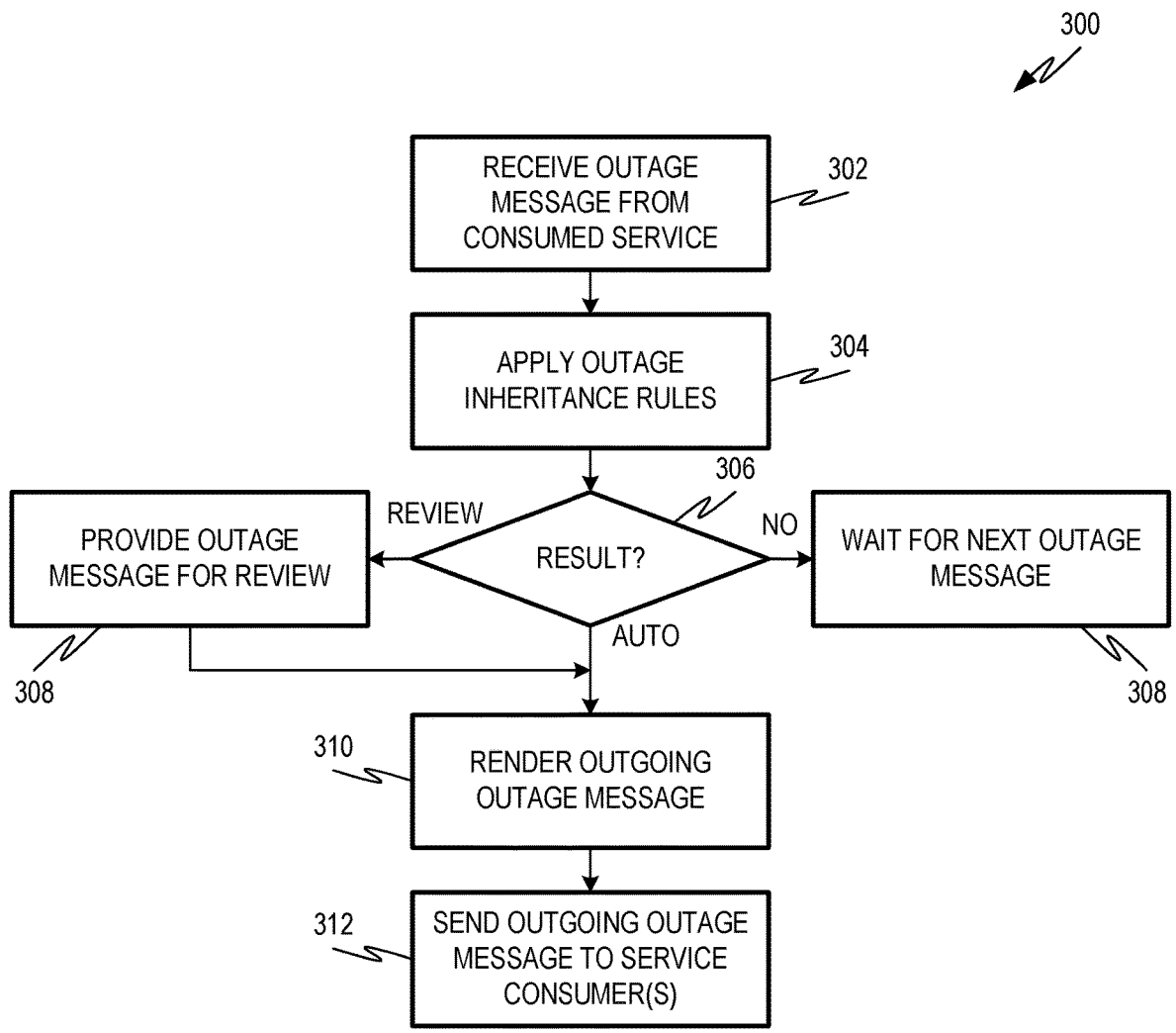
FIG. 3 is a flowchart showing one example of a process flow that may be executed by a cloud service provider system to implement cloud outage reporting.

FIG. 3 is a flowchart showing one example of a process flow 300 that may be executed by a cloud service provider system (e.g., an outage monitor system thereof) to implement cloud outage reporting. At operation 302, the cloud service provider system receives an outage message from a consumed service. For example, the cloud service provider system may receive an outage message from a lower-level cloud service provider system that provides a software service that is consumed by the cloud service provider system executing the process flow 300.

At operation 304, the cloud service provider system applies a set of one or more outage inheritance rules. If, at operation 306, the result of the application of the inheritance rules indicates that the incoming outage message is not to be reported to the cloud service provider system's consumers, the cloud service provider system waits for the next outage message at operation 308. While waiting for the next outage message, the cloud service provider system may continue to provide its software service for consumption by downstream cloud service provider systems and/or end-consumer systems.

If, at operation 306, the result of the application of the inheritance rules indicates that the incoming outage message is to be provided to the cloud service provider system's consumers, the cloud service provider system uses its render to render an outgoing outage message at operation 310. For example, the outgoing outage message may be a revised version of the incoming outage message. In some examples, there may not be a one-to-one correlation between outage messages received and outage messages provided to the renderer at operation 310. Consider an example in which the SLA of the consumed service calls for outage messages at a first frequency f1 and the SLA for service consumers calls for outage messages at a second frequency f2. The cloud service provider system may modify the frequency f1 of the incoming outage messages from consumed services to correspond to the frequency f2 of outgoing outage messages to consuming services. For example, if f2 is less than f1, then the cloud service provider system may decline to send some otherwise-reportable outage messages to the renderer. If f2 is greater than f1, then the cloud service provider system may send an incoming outage message to the renderer more than once.

If, at operation 306, the result of the application of the inheritance rules indicates that a human review of the incoming outage message is desirable, the cloud service provider system provides the outage message to a human user for review at operation 308. Upon review by the human user, the incoming message (e.g., with changes instructed by the human user) is provided to the renderer at operation 310 as described. In some examples, the human user will decide not to send the incoming message to the cloud service provider system's consumers, in which case further operations may be skipped. At operation 312, the cloud service provider system sends the revised outage message to the consumers of the software service provided by the cloud service provider system.

Figure 4:
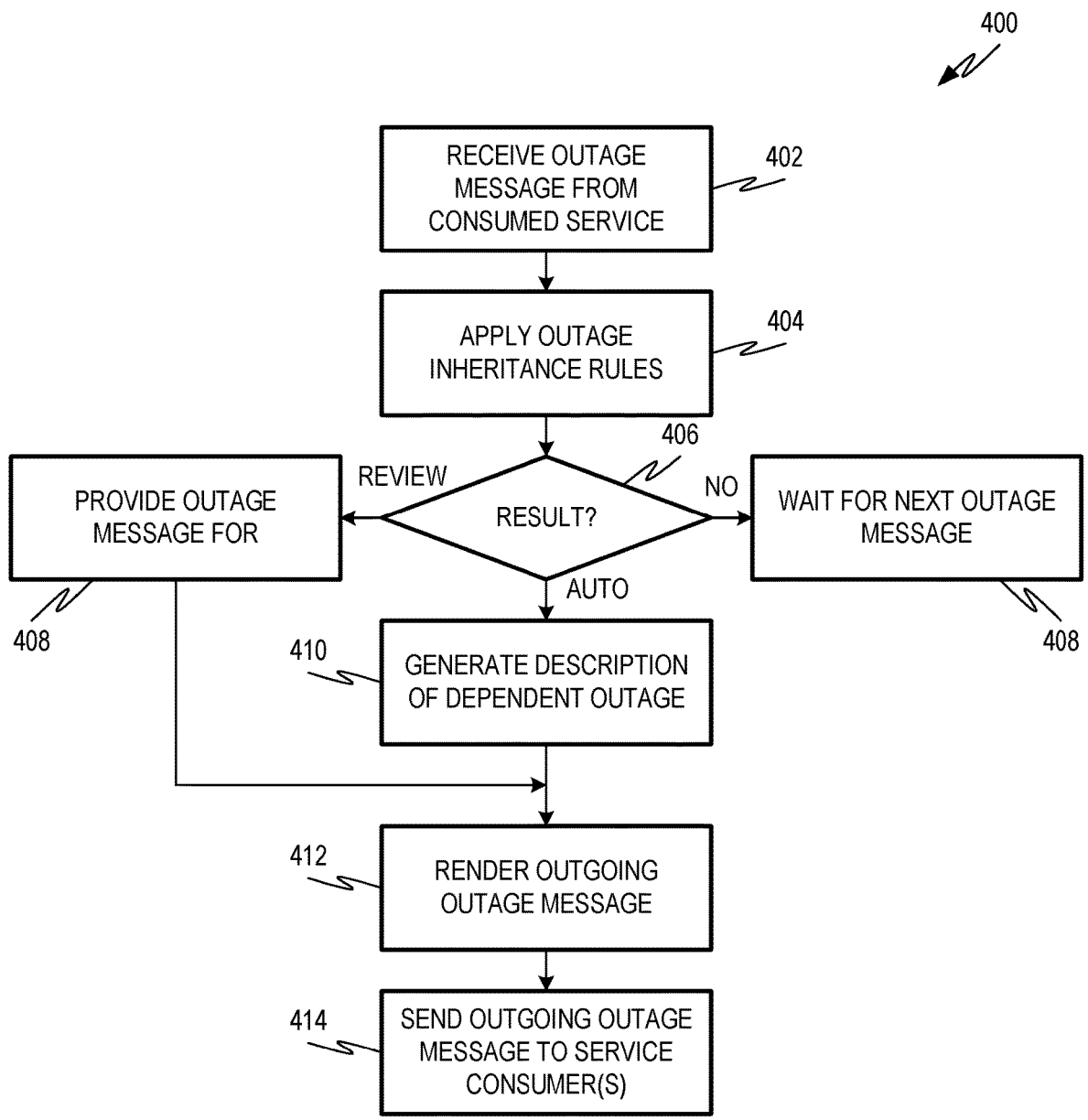
FIG. 4 is a flowchart showing one example of a process flow that may be executed by a cloud service provider system to implement cloud outage reporting based on dependent services.

FIG. 4 is a flowchart showing one example of a process flow 400 that may be executed by a cloud service provider system (e.g., an outage monitor system thereof) to implement cloud outage reporting based on dependent services. In the example of FIG. 4, inheritance rules applied by the cloud service provider system are based at least in part on a dependency between a software service consumed by the cloud service provider system and a software service provided by the cloud service provider system to one or more of its consumer, as described in more detail herein.

At operation 402, the cloud service provider system receives an outage message from a consumed service. For example, the cloud service provider system may receive an outage message from a lower-level cloud service provider system that provides a software service that is consumed by the cloud service provider system executing the process flow 400.

At operation 404, the cloud service provider system applies a set of one or more outage inheritance rules. The outage inheritance rules applied at operation 404 include at least one rule based on dependency. For example, the incoming outage message describes an outage at a service consumed by the cloud service provider system. Applying a dependency rule may include determining whether and/or to what extent the outage at the software service consumed by the cloud service provider system will affect one or more software services provided by the cloud service provider system. For example, a dependency may occur if the outage of the consumed service prevents the cloud service provider system from providing its own software service to its own consumers. Also, in some examples, a dependency may be determined if the outage of the consumed service prevents the cloud provider system from meeting one or more terms of an SLA associated with its own software service provided to its own consumers.

If, at operation 406, the result of the application of the inheritance rules indicates that the incoming outage message is not to be reported to the cloud service provider system's consumers, the cloud service provider system waits for the next outage message at operation 408. While waiting for the next outage message, the cloud service provider system may continue to provide its software service for consumption by downstream cloud service provider systems and/or end-consumer systems.

If, at operation 406, the result of the application of the inheritance rules indicates that the incoming outage message is to be provided to the cloud service provider system's consumers, the cloud service provider system, at operation 410, generates a description of the dependent outage. The description of the dependent outage can include, for example, an indication of how the outage at the software service consumed by the cloud service provider system will affect the software service provided by the cloud service provider system. At operation 412, the incoming message and the description of the dependent outage are provided to the renderer of the cloud service provider system, which renders a revised outage message.

If, at operation 406, the result of the application of the inheritance rules indicates that a human review of the incoming outage message is desirable, the cloud service provider system provides the outage message to a human user for review at operation 408. Upon review by the human user, the incoming message (e.g., with changes instructed by the human user) is provided to the renderer at operation 412 as described. In some examples, the human user will also provide a description of a dependent outage to the renderer. In some examples, the human user will decide not to send the incoming message to the cloud service provider system's consumers, in which case further operations may be skipped. At operation 414, the cloud service provider system sends the revised outage message to the consumers of the software service provided by the cloud service provider system.

Figure 5:
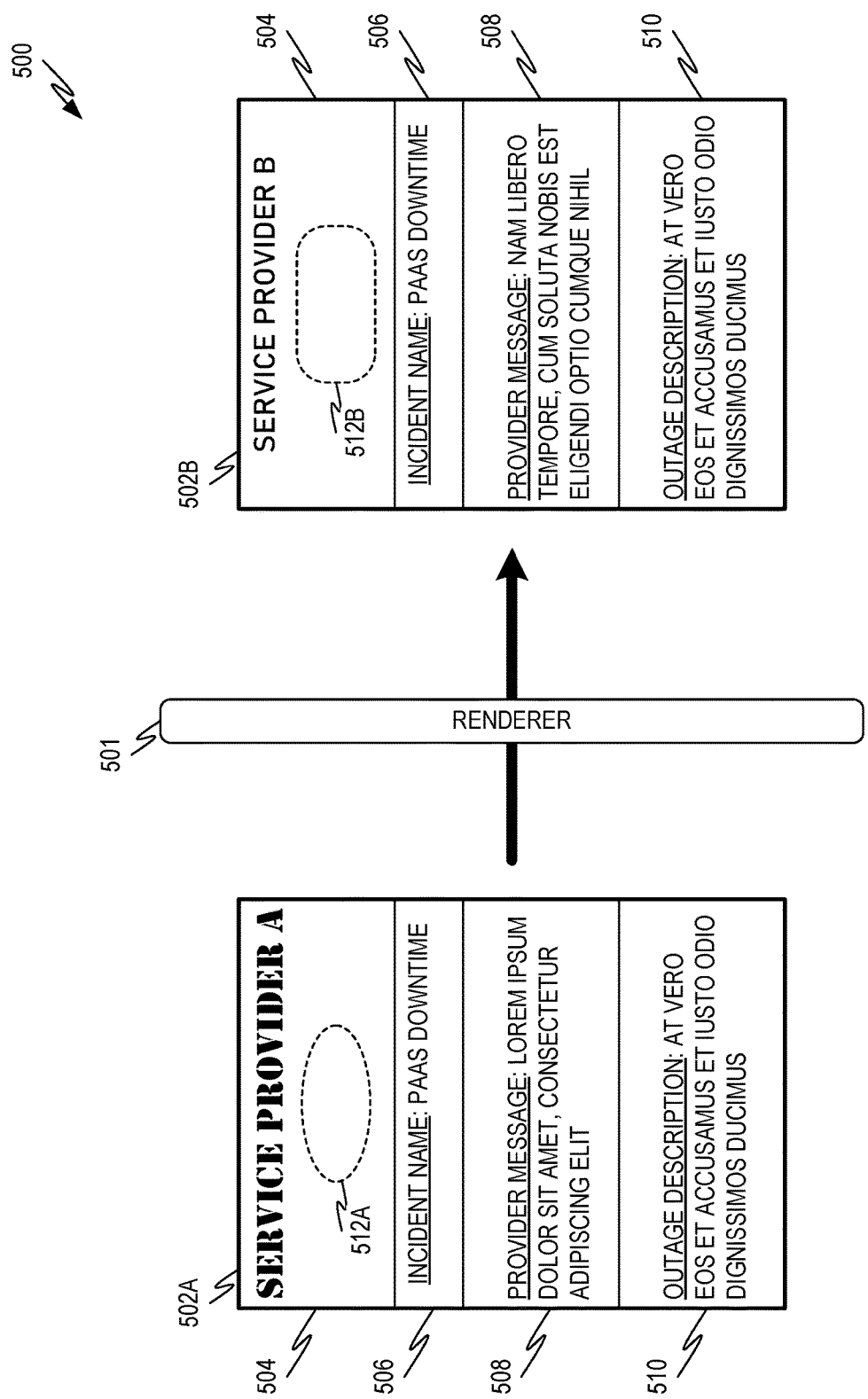
FIG. 5 is a workflow diagram showing one example of a workflow that may be executed by a renderer of a cloud service provider system to generate a revised outage message.

FIG. 5 is a workflow diagram showing one example of a workflow 500 that may be executed by a renderer of a cloud service provider system to generate a revised outage message. In the example of FIG. 5, an incoming outage message 502A is provided to a renderer 501, which may be any of the renderers described herein. The renderer 501 generates a revised outage message 502B, that can be provided to a service consumer.

The incoming outage message comprises an origin field 504 that may include a name (SERVICE PROVIDER A) and a logo 512A of the cloud service provider system that generated the incoming outage message 502A. The incoming outage message 502A may also include an incident name field 506 indicating a name of the outage used by the cloud service provider system that generated the incoming outage message 502A. A provider message field 508 may indicate a message from the cloud service provider system that generated the incoming outage message 502A. For example, the provider message field 508 may include an explanation of how the outage will affect the relevant consumed service. An outage description field 510 includes a description of the reported outage.

The renderer 501 may process the incoming outage message 502A to generate the outgoing outage message 502B. The processing may include, at the origin field 504, replacing the name (SERVICE PROVIDER A) and logo 512A of the cloud service provider system at the incident name field 506 that generated the incoming outage message 502A with the name (SERVICE PROVIDER B) and logo 512B of the cloud service provider system implementing the renderer 501. At the provider message field 508, the renderer 501 may replace, supplement, and/or modify the provider message from the incoming outage message 502A to generate a modified provider message. For example, the modified provider message at the provider message field 508 may include a description of how the outage will affect the service provided by the cloud service provider system implementing the renderer 501. In some examples, the incident name field 506 and outage description field 510 may remain the same. The revised outage message 502B may be provided to one or more service consumers as described herein.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

EXAMPLES

Example 1 is a cloud service provider system for providing software services to one or more consumer systems, the system comprising: at least one processor programmed to perform operations comprising: receiving a first outage message from a second cloud service provider system, the first outage message describing a first outage of a first software service consumed by the cloud service provider system and provided by the second cloud service provider system; applying a set of outage inheritance rules to the first outage message; based on the applying of the set of outage inheritance rules to the first outage message, determining that the first outage is to be automatically reported; rendering a revised first outage message; and sending the revised first outage message to a consumer system that receives a second software service provided by the cloud service provider system.

In Example 2, the subject matter of Example 1 optionally includes the operations further comprising: determining a dependent functionality of the second software service, the dependent functionality of the second software service being dependent on the first software service; and generating a revised description indicating the dependent functionality of the second software service, the revised first outage message comprising the revised description.

In Example 3, the subject matter of any one or more of Examples 1-2 optionally include the operations further comprising: receiving, from the second cloud service provider system, a second outage message describing a second outage of the first software service; applying the set of outage inheritance rules to the second outage; based on the applying of the set of outage inheritance rules to the second outage, determining to prompt a manual review of the second outage message; and sending the second outage message to a user computing device.

In Example 4, the subject matter of Example 3 optionally includes the operations further comprising: receiving, from the user computing device, second outage information describing the second outage of the first software service; rendering a revised second outage message using the second outage information; and sending the revised second outage message to the consumer system.

In Example 5, the subject matter of any one or more of Examples 1-4 optionally include the operations further comprising: receiving, from the second cloud service provider system, a third outage message describing a third outage of the first software service; applying the set of outage inheritance rules to the third outage; based on the applying of the set of outage inheritance rules to the third outage, determining to prompt a manual review of the third outage message; and sending the third outage message to a user computing device.

In Example 6, the subject matter of any one or more of Examples 1-5 optionally include the first outage message comprising category data, the category data describing a category of the first outage, at least one of the set of outage inheritance rules being based on the category of the first outage.

In Example 7, the subject matter of any one or more of Examples 1-6 optionally include the operations further comprising accessing consumer subscription data describing outage messages subscribed to by the consumer system, the applying of the set of outage inheritance rules based at least in part on the consumer subscription data.

In Example 8, the subject matter of any one or more of Examples 1-7 optionally include the operations further comprising: receiving a native outage message describing an outage at the cloud service provider system affecting the second software service provided to the consumer system; rendering a native outage message; and sending the native outage message to the consumer system.

In Example 9, the subject matter of any one or more of Examples 1-8 optionally include the rendering of the revised first outage message comprising at least one of replacing an original graphic of the first outage message with a revised graphic or replacing an original outage description with a revised outage description.

Example 10 is a method for providing software services to one or more consumer systems, the method comprising: receiving, by a first cloud service provider system outage monitor, a first outage message from a second cloud service provider system, the first outage message describing a first outage of a first software service consumed by the first cloud service provider system and provided by the second cloud service provider system; applying, by the first cloud service provider system outage monitor, a set of outage inheritance rules to the first outage message; based on the applying of the set of outage inheritance rules to the first outage message, determining, by the first cloud service provider system outage monitor, that the first outage is to be auto-reported; rendering, by a renderer of the first cloud service provider system, a revised first outage message; and sending, by the first cloud service provider system outage monitor, the revised first outage message to a consumer system that receives a second software service provided by the first cloud service provider system.

In Example 11, the subject matter of Example 10 optionally includes determining, by the first cloud service provider system outage monitor, a dependent functionality of the second software service, the dependent functionality of the second software service being dependent on the first software service; and generating, by the first cloud service provider system outage monitor, a revised description indicating the dependent functionality of the second software service, the revised first outage message comprising the revised description.

In Example 12, the subject matter of any one or more of Examples 10-11 optionally include receiving, by the first cloud service provider system outage monitor and from the second cloud service provider system, a second outage message describing a second outage of the first software service; applying, by the first cloud service provider system outage monitor, the set of outage inheritance rules to the second outage; based on the applying of the set of outage inheritance rules to the second outage, determining, by the first cloud service provider system, to prompt a manual review of the second outage message; and sending, by the first cloud service provider system, the second outage message to a user computing device.

In Example 13, the subject matter of Example 12 optionally includes receiving, from the user computing device, second outage information describing the second outage of the first software service; rendering, by the renderer of the first cloud service provider system outage monitor, a revised second outage message using the second outage information; and sending, by the first cloud service provider system outage monitor, the revised second outage message to the consumer system.

In Example 14, the subject matter of any one or more of Examples 10-13 optionally include receiving, by the first cloud service provider system outage monitor and from the second cloud service provider system, a third outage message describing a third outage of the first software service; applying, by the first cloud service provider system outage monitor, the set of outage inheritance rules to the third outage; based on the applying of the set of outage inheritance rules to the third outage, determining, by the first cloud service provider system outage monitor, to prompt a manual review of the third outage message; and sending, by the first cloud service provider system outage monitor, the third outage message to a user computing device.

In Example 15, the subject matter of any one or more of Examples 10-14 optionally include the first outage message comprising category data, the category data describing a category of the first outage, at least one of the set of outage inheritance rules being based on the category of the first outage.

In Example 16, the subject matter of any one or more of Examples 10-15 optionally include accessing, by the first cloud service provider system, consumer subscription data describing outage messages subscribed to by the consumer system, the applying of the set of outage inheritance rules based at least in part on the consumer subscription data.

In Example 17, the subject matter of any one or more of Examples 10-16 optionally include receiving, by the first cloud service provider system outage monitor, a native outage message describing an outage at the first cloud service provider system affecting the second software service provided to the consumer system; rendering, by the renderer of the first cloud servicer provider system, a native outage message; and sending, by the first cloud service provider system outage monitor, the native outage message to the consumer system.

In Example 18, the subject matter of any one or more of Examples 10-17 optionally include the rendering of the revised first outage message comprising replacing an original graphic of the first outage message with a revised graphic.

In Example 19, the subject matter of any one or more of Examples 10-18 optionally include the rendering of the revised first outage message comprising replacing an original outage description with a revised outage description.

Example 20 is a non-transitory machine-readable medium comprising instructions thereon that, when executed by at least one processor, cause the at least one processor to perform operations comprising: receiving a first outage message from a second cloud service provider system, the first outage message describing a first outage of a first software service consumed by a first cloud service provider system and provided by the second cloud service provider system; applying a set of outage inheritance rules to the first outage message; based on the applying of the set of outage inheritance rules to the first outage message, determining that the first outage is to be auto-reported; rendering a revised first outage message; and sending the revised first outage message to a consumer system that receives a second software service provided by the first cloud service provider system.

Figure 6:
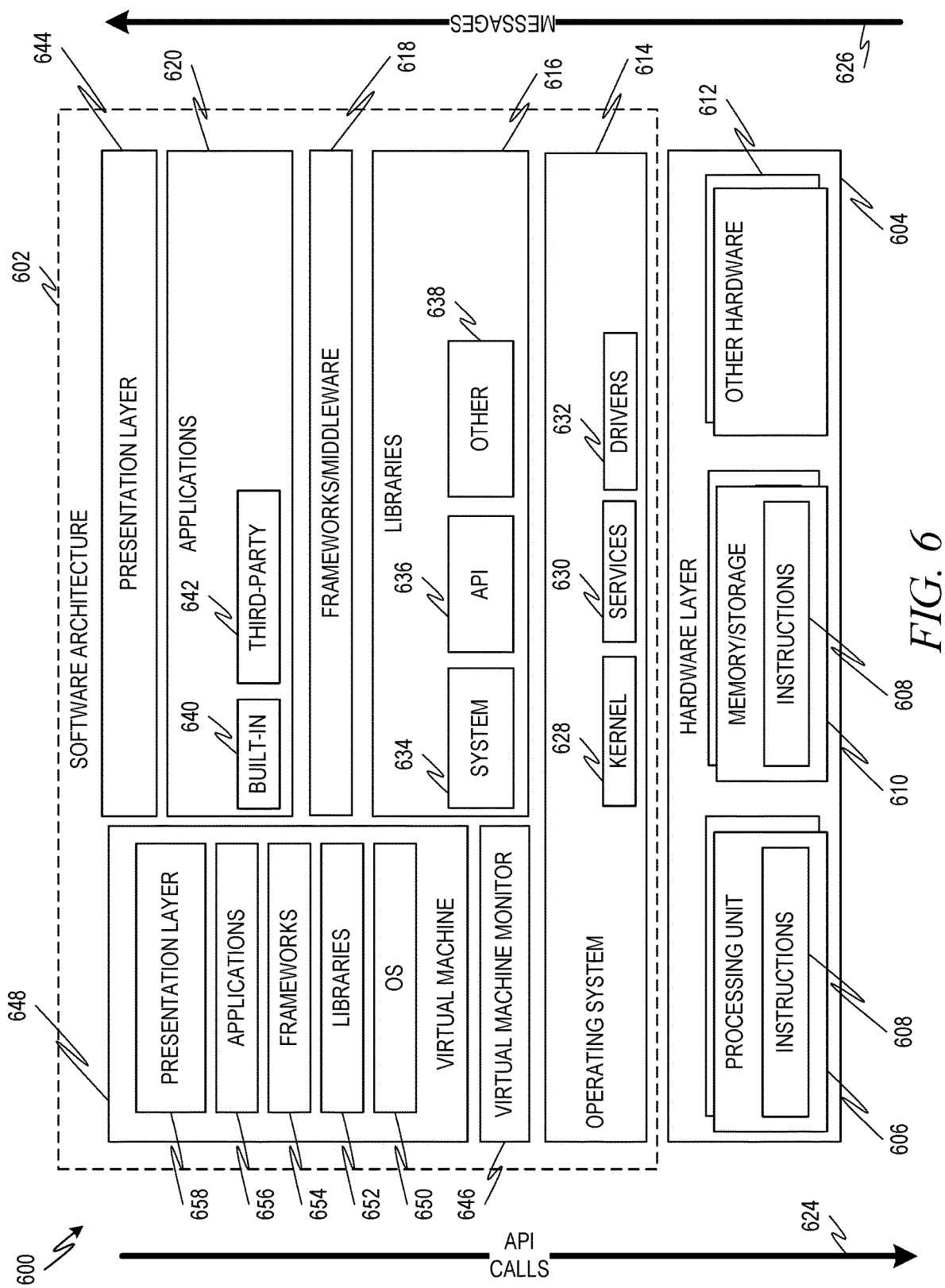
FIG. 6 is a block diagram showing one example of a software architecture for a computing device.

FIG. 6 is a block diagram 600 showing one example of a software architecture 602 for a computing device. The architecture 602 may be used in conjunction with various hardware architectures, for example, as described herein. FIG. 6 is merely a non-limiting example of a software architecture and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system of FIG. 6.

The representative hardware layer 604 comprises one or more processing units 606 having associated executable instructions 608. Executable instructions 608 represent the executable instructions of the software architecture 602, including implementation of the methods, modules, subsystems, and components, and so forth described herein and may also include memory and/or storage modules 610, which also have executable instructions 608. Hardware layer 604 may also comprise other hardware as indicated by other hardware 612 which represents any other hardware of the hardware layer 604, such as the other hardware illustrated as part of the architecture 602.

In the example architecture of FIG. 6, the software architecture 602 may be conceptualized as a stack of layers where each layer provides particular functionality. For example, the software architecture 602 may include layers such as an operating system 614, libraries 616, frameworks/middleware layer 618, applications 620, and presentation layer 644. Operationally, the applications 620 and/or other components within the layers may invoke API calls 624 through the software stack and access a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks/middleware layer 618 (also sometimes referred to as middleware) may provide a higher-level common infrastructure that may be utilized by the applications 620 and/or other software components/modules. For example, the frameworks/middleware layer 618 may provide various graphic user interface (GUI) functions, high-level resource management, high-level location services, and so forth. The frameworks/middleware layer 618 may provide a broad spectrum of other APIs that may be utilized by the applications 620 and/or other software components/modules, some of which may be specific to a particular operating system or platform.

The applications 620 includes built-in applications 640 and/or third party applications 642. Examples of representative built-in applications 640 may include, but are not limited to, a contacts application, a browser application, a book reader application, a location application, a media application, a messaging application, and/or a game application. Third party applications 642 may include any of the built in applications as well as a broad assortment of other applications. In a specific example, the third party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 642 may invoke the API calls 624 provided by the mobile operating system such as operating system 614 to facilitate functionality described herein.

The applications 620 may utilize built in operating system functions (e.g., kernel 628, services 630 and/or drivers 632), libraries (e.g., system 634, API libraries 636, and other libraries 638), and frameworks/middleware layer 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine as well as the interface with the host operating system (i.e., operating system 614). A software architecture executes within the virtual machine such as an operating system 650, libraries 652, frameworks/middleware 654, applications 656 and/or presentation layer 658. These layers of software architecture executing within the virtual machine 648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
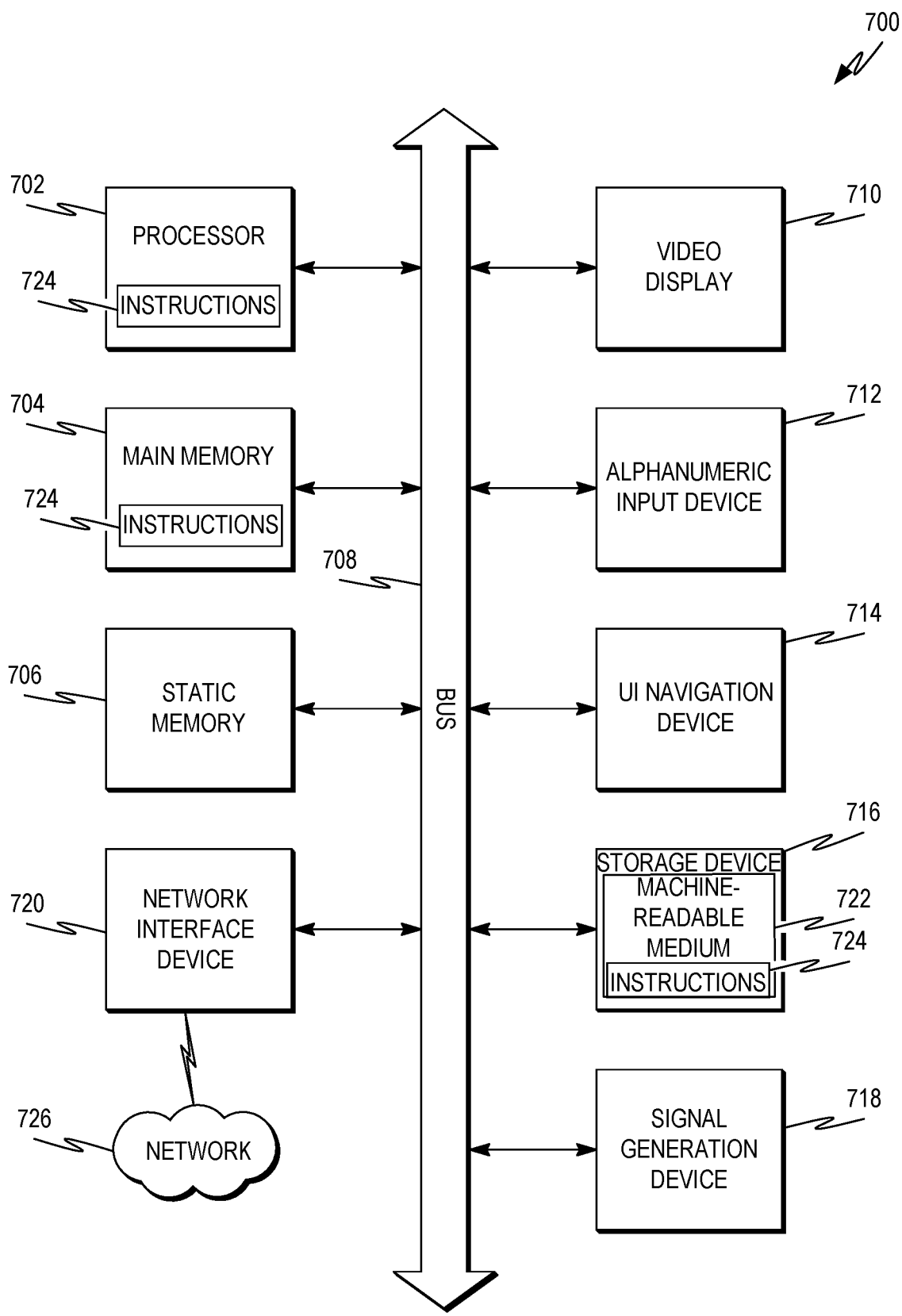
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A first cloud service provider system for providing a first software service to one or more consumer systems, the system comprising:
    at least one processor programmed to perform operations comprising:
        receiving a first outage message from a second cloud service provider system, the first outage message describing a first outage of a second software service consumed by the first cloud service provider system and provided by the second cloud service provider system, the first software service being provided to the one or more consumer systems based at least in part on the second software service;
        applying a set of outage inheritance rules to the first outage message, the set of outage inheritance rules indicating dispositions for outage messages received by the first cloud service provider system;
        based on the applying of the set of outage inheritance rules to the first outage message, determining that the first outage is to be automatically reported;
        rendering a revised first outage message; and
        sending the revised first outage message to a consumer system that receives the first software service.

2. The system of claim 1, the operations further comprising:
    determining a dependent functionality of the first software service, the dependent functionality of the first software service being dependent on the second software service; and
    generating a revised description indicating the dependent functionality of the first software service, the revised first outage message comprising the revised description.

3. The system of claim 1, the operations further comprising:
    receiving, from the second cloud service provider system, a second outage message describing a second outage of the second software service;
    applying the set of outage inheritance rules to the second outage;
    based on the applying of the set of outage inheritance rules to the second outage, determining to prompt a manual review of the second outage message; and
    sending the second outage message to a user computing device.

4. The system of claim 3, the operations further comprising:
    receiving, from the user computing device, second outage information describing the second outage of the second software service;
    rendering a revised second outage message using the second outage information; and
    sending the revised second outage message to the consumer system.

5. The system of claim 1, the operations further comprising:
    receiving, from the second cloud service provider system, a third outage message describing a third outage of the second software service;
    applying the set of outage inheritance rules to the third outage;
    based on the applying of the set of outage inheritance rules to the third outage, determining to prompt a manual review of the third outage message; and
    sending the third outage message to a user computing device.

6. The system of claim 1, the first outage message comprising category data, the category data describing a category of the first outage, at least one of the set of outage inheritance rules being based on the category of the first outage.

7. The system of claim 1, the operations further comprising accessing consumer subscription data describing outage messages subscribed to by the consumer system, the applying of the set of outage inheritance rules based at least in part on the consumer subscription data.

8. The system of claim 1, the operations further comprising:
    receiving a native outage message describing an outage at the first cloud service provider system affecting the first software service provided to the consumer system;
    rendering a native outage message; and sending the native outage message to the consumer system.

9. The system of claim 1, the rendering of the revised first outage message comprising at least one of replacing an original graphic of the first outage message with a revised graphic or replacing an original outage description with a revised outage description.

10. A method for providing a first software service to one or more consumer systems, the method comprising:
receiving, by a first cloud service provider system outage monitor, a first outage message from a second cloud service provider system, the first outage message describing a first outage of a second software service consumed by a first cloud service provider system and provided by the second cloud service provider system, the first software service being provided to the one or more consumer systems based at least in part on the second software service;
applying, by the first cloud service provider system outage monitor, a set of outage inheritance rules to the first outage message, the set of outage inheritance rules indicating dispositions for outage messages received by the first cloud service provider system;
based on the applying of the set of outage inheritance rules to the first outage message, determining, by the first cloud service provider system outage monitor, that the first outage is to be auto-reported;
rendering, by a renderer of the first cloud service provider system, a revised first outage message; and
sending, by the first cloud service provider system outage monitor, the revised first outage message to a consumer system that receives the first software service.

11. The method of claim 10, further comprising:
determining, by the first cloud service provider system outage monitor, a dependent functionality of the first software service, the dependent functionality of the first software service being dependent on the second software service; and
generating, by the first cloud service provider system outage monitor, a revised description indicating the dependent functionality of the first software service, the revised first outage message comprising the revised description.

12. The method of claim 10, further comprising:
receiving, by the first cloud service provider system outage monitor and from the second cloud service provider system, a second outage message describing a second outage of the second software service;
applying, by the first cloud service provider system outage monitor, the set of outage inheritance rules to the second outage;
based on the applying of the set of outage inheritance rules to the second outage, determining, by the first cloud service provider system, to prompt a manual review of the second outage message; and
sending, by the first cloud service provider system, the second outage message to a user computing device.

13. The method of claim 12, further comprising:
receiving, from the user computing device, second outage information describing the second outage of the second software service;
rendering, by the renderer of the first cloud service provider system outage monitor, a revised second outage message using the second outage information; and
sending, by the first cloud service provider system outage monitor, the revised second outage message to the consumer system.

14. The method of claim 10, further comprising;
receiving, by the first cloud service provider system outage monitor and from the second cloud service provider system, a third outage message describing a third outage of the second software service;
applying, by the first cloud service provider system outage monitor, the set of outage inheritance rules to the third outage;
based on the applying of the set of outage inheritance rules to the third outage, determining, by the first cloud service provider system outage monitor, to prompt a manual review of the third outage message; and
sending, by the first cloud service provider system outage monitor, the third outage message to a user computing device.

15. The method of claim 10, the first outage message comprising category data, the category data describing a category of the first outage, at least one of the set of outage inheritance rules being based on the category of the first outage.

16. The method of claim 10, further comprising accessing, by the first cloud service provider system, consumer subscription data describing outage messages subscribed to by the consumer system, the applying of the set of outage inheritance rules based at least in part on the consumer subscription data.

17. The method of claim 10, further comprising:
receiving, by the first cloud service provider system outage monitor, a native outage message describing an outage at the first cloud service provider system affecting the first software service provided to the consumer system;
rendering a native outage message; and
sending the native outage message to the consumer system.

18. The method of claim 10, the rendering of the revised first outage message comprising replacing an original graphic of the first outage message with a revised graphic.

19. The method of claim 10, the rendering of the revised first outage message comprising replacing an original outage description with a revised outage description.

20. A non-transitory machine-readable medium comprising instructions thereon that, when executed by at least one processor of a first cloud service provider system, cause the first cloud service provider system to perform operations comprising:
providing a first software service to one or more consumer systems, the first software service being based at least in part on a second software service provided to the first cloud service provider system by a second cloud service provider system:
receiving a first outage message from the second cloud service provider system, the first outage message describing a first outage of the second software service;
applying a set of outage inheritance rules to the first outage message, the set of outage inheritance rules indicating dispositions for outage messages received by the first cloud service provider system;
based on the applying of the set of outage inheritance rules to the first outage message, determining that the first outage is to be auto-reported;
rendering a revised first outage message; and
sending the revised first outage message to a consumer system that receives the first software service.

* * * * *